RE 24800

June 24, 1958      C. G. DE BLASIO      2,840,777

DIRECT CURRENT POWER SOURCE

Filed March 21, 1955      3 Sheets-Sheet 1

INVENTOR.
CONRAD G. DeBLASIO
BY
*Harold Gregory*
ATTORNEY

June 24, 1958 C. G. DE BLASIO 2,840,777
DIRECT CURRENT POWER SOURCE
Filed March 21, 1955 3 Sheets-Sheet 2

INVENTOR.
CONRAD G. DeBLASIO
BY
Harold Q. Gregory
ATTORNEY

INVENTOR.
CONRAD G. DeBLASIO
BY
Harold W. Gregory
ATTORNEY

United States Patent Office 2,840,777
Patented June 24, 1958

2,840,777
DIRECT CURRENT POWER SOURCE
Conrad G. De Blasio, Middletown, N. J.

Application March 21, 1955, Serial No. 495,619

10 Claims. (Cl. 323—22)

My invention relates to improvements in regulating methods and means for a direct current power source, and more particularly to a regulating method and means wherein vacuum tube voltage-regulator circuits are used to maintain a constant D. C. output voltage across the load by regulating action accomplished, in part, by employment of one or more so-called degenerative or feedback circuits.

Voltage regulator circuits coming within the general class to which my improved system or circuit relates are disclosed in United States Letters Patent Nos. 2,780,734; 2,609,527; 2,607,912; 2,602,915; 2,569,500; and 2,556,-129. Reference might also be made to the respective disclosures in United States Letters Patent Nos. 2,462,-935; 2,567,880; 2,594,572; and 2,625,675.

One form of regulated direct current power source used heretofore comprises an input comparator system or circuit, a reference system or circuit, an amplifier, and one or more series tubes connected to function as a control unit. In many applications or uses of such power sources, it is required that the output potential be adjusted down to zero. However, performance within the output-voltage range from zero to about ten volts, in these power sources or systems of the prior art, is very poor with regard to stability and regulation.

An object of the present invention resides in the provision of a direct current power source or system of the character referred to, but which embodies regulating means so characterized and so disposed in the system as to give an entirely new order of performance in the field of wide-range, regulated, D. C. voltage or current, and among other specific things, to give steady, ripple-free voltages at a fraction of one volt.

Another object resides in the provision of a direct current power source or system of excellent long time stability, in which there are no moving parts, and which is exceptionally compact for the power rating.

Other objects and advantages will hereinafter appear.

For the purpose of illustrating my invention, an embodiment thereof is shown in the drawings, wherein Fig. 1 is a simplified schematic diagram of a D. C. power source of the prior art and of the general type or class to which my improved power source or system relates;

Figure 1:
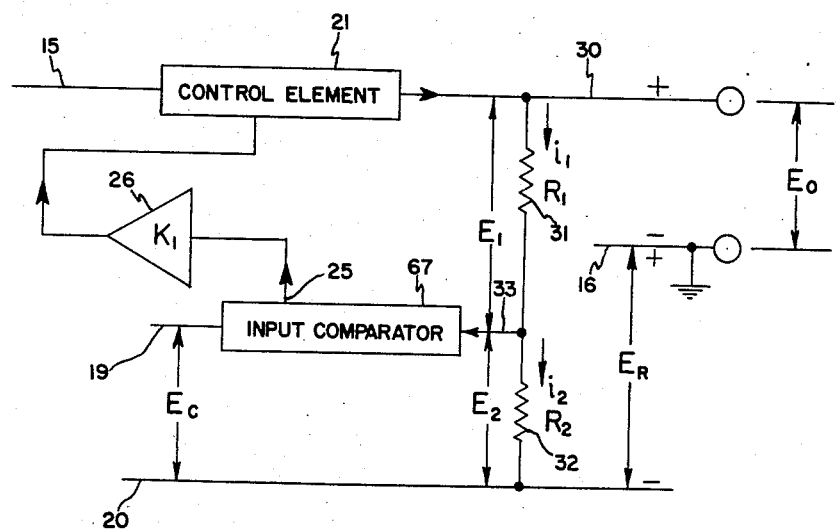
Figure 2:
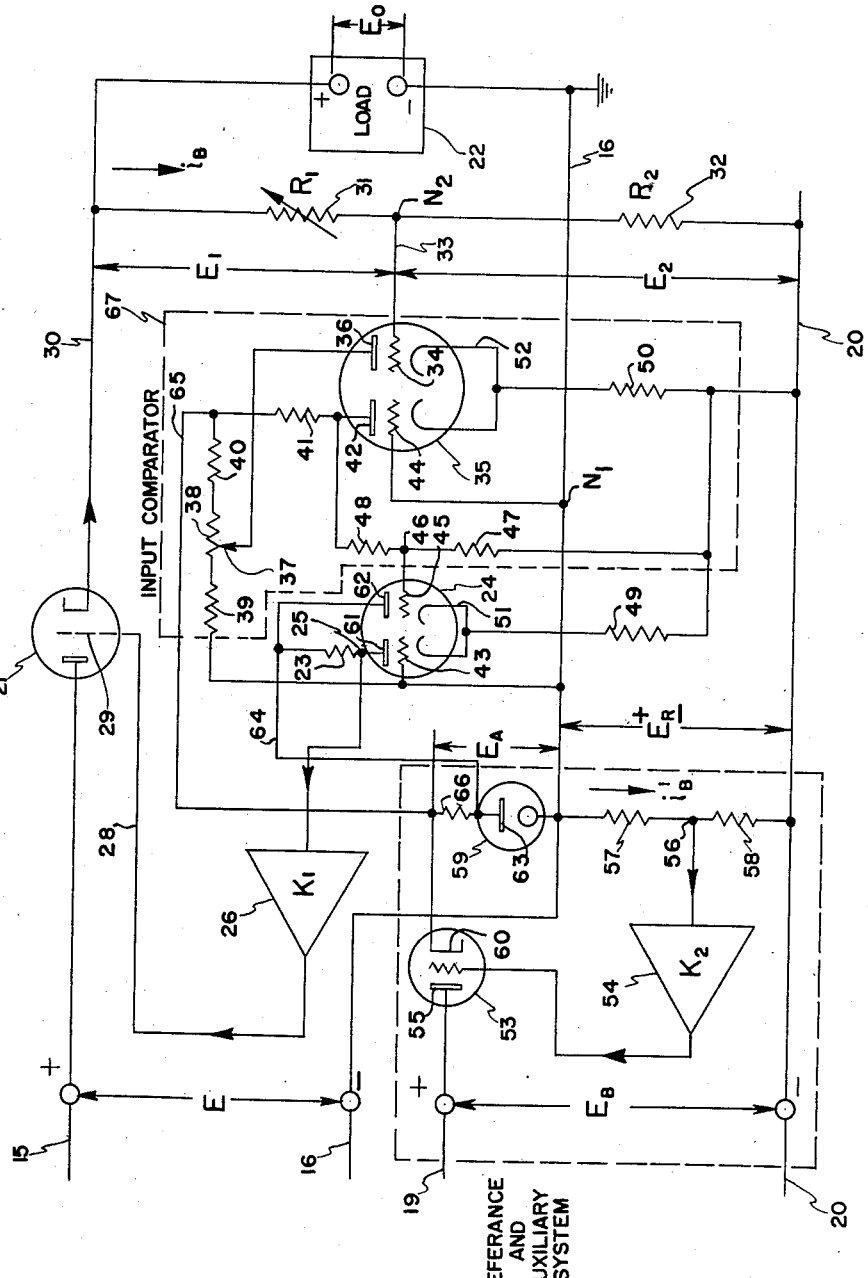
Fig. 2 is a simplified schematic diagram of a D. C. power source or system embodying my invention.
Figure 4:
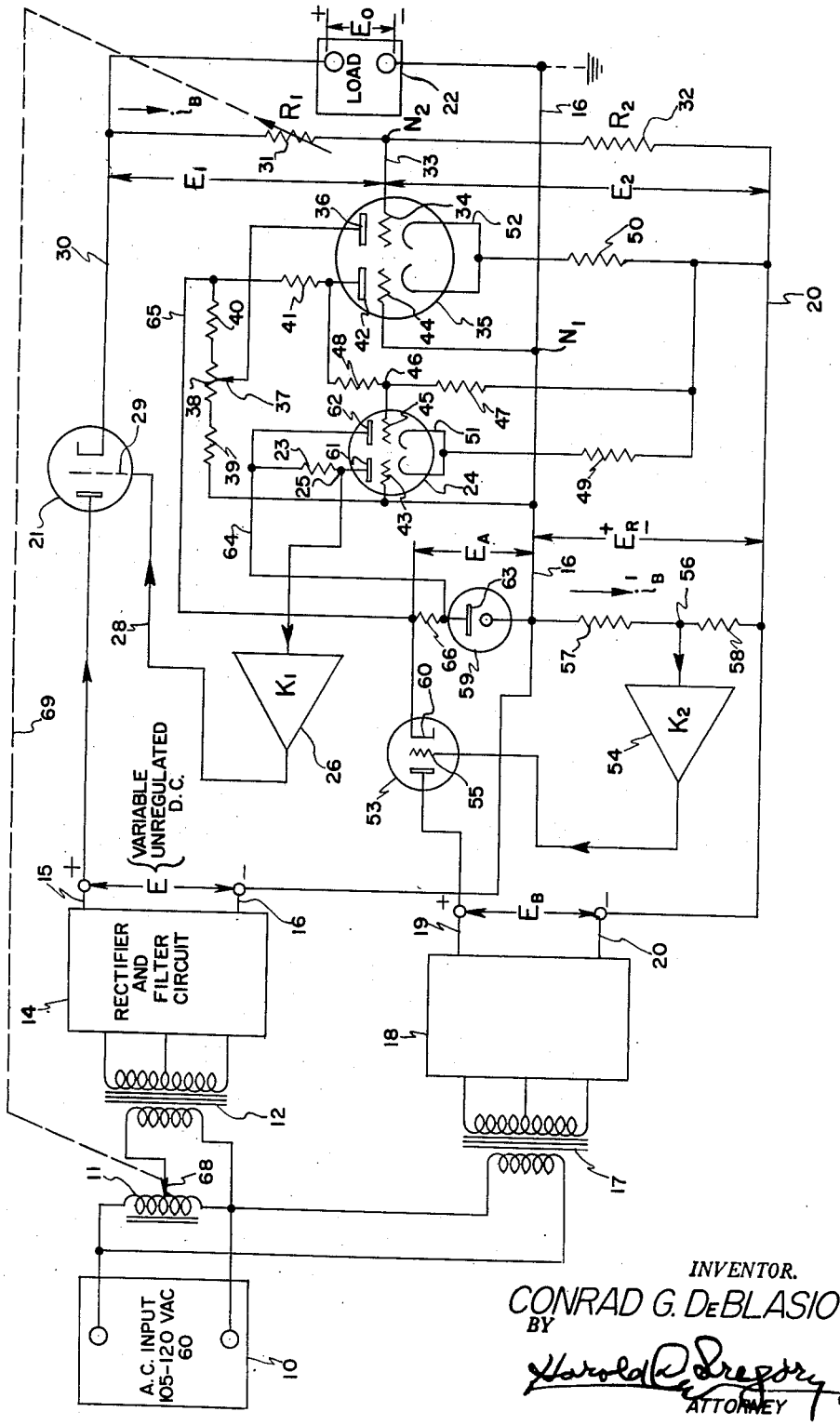
Fig. 4 is a view similar to Fig. 2 and showing a form of dual D. C. supply for the main high-voltage line to load, and for the reference and auxiliary control circuits, respectively.

Where possible, in Figs. 1, 2 and 4 the various connections, circuits, components, and values which correspond are designated by the same, respective, reference numerals or characters.

In Fig. 1, lines 15 and 16 are connected to a suitable supply of variable, unregulated direct current. The useful output voltage is designated as $E_o$. A D. C. reference potential $E_c$ is impressed across lines 19 and 20. Any change in $E_o$ is reflected back to connection 33 from a constant-current divider to which the D. C. output voltage is applied and which comprises resistors 31 and 32. This is then compared through an input comparator 67 which may be one of any well known systems or circuits for this purpose. The difference between $E_c$ and $E_2$ appears at 25. This difference is amplified by an amplifier circuit 26 whose gain is designated $K_1$. The output from amplifier 26 is fed into the control element or circuit 21 whose output line 30 is the positive line of the D. C. output, $E_o$. The respective values $R_1$ and $R_2$ of resistors 31 and 32 are such as to place input comparator 67 below the potential of the negative line 16, as indicated. Accordingly, when $E_o$ is substantially zero or at least is approaching zero as a limit, input comparison can be said to be performed at a potential of minus $E_1$ (below ground). On this basis, the total bias potential is minus $E_R$. A fraction of the voltage between output line 30 and the bias potential $E_2$ is employed for input comparator 67. Under all of these conditions, the value of output voltage $E_o$ can be expressed as follows, in terms of $E_c$, $E_R$, $R_1$ and $R_2$.

$$E_o = \frac{E_c(R_1+R_2)}{R_2} - E_R$$

The following disadvantages in the prior art system of Fig. 1 are apparent from the equation for $E_o$.

First; the output voltage $E_o$ is determined by the difference between two large quantities. From this fact it follows from the equation that a small error in either of the two large quantities reflects a very large error in the difference when the difference is small.

Second; since the sample is usually small in order to leave adequate operating potentials for the amplifier tubes, the D. C. gain is greatly reduced, particularly for values approaching zero.

Third; errors which appear in the input comparator 67 are multiplied by the following factor.

$$\frac{E_1+E_2}{E_2}$$

Fourth; changes in the bias potential $E_R$ reflect an equal absolute change in the output at voltages near zero.

Because of the above reasons, it has been conventionally accepted that low-voltage performance of the aforesaid prior art D. C. voltage sources or systems is very poor with regard to stability and regulation.

Several of the novel features of my improved direct current power source disclosed herein are shown and described in my copending application given Serial No. 605,133 and filed August 20, 1956. Thus, the system disclosed herein is comparable with the D. C. power source or system disclosed in application Serial No. 605,133. For the purposes of comparison and whenever it has been feasible, the various connections, circuitry, components, elements and values which correspond or are equivalent in my two applications, have been designated by the same, respective reference numerals or characters.

With reference now to Figs. 2 and 4, a main supply 10 of alternating current supplies a continuously variable auto transformer 11 which, in turn, supplies a plate transformer 12 and its associated rectifier and filter system 14 across the output lines 15 and 16 of which there is produced a source E of high voltage D. C., variable and unregulated. Also supplied from the main, A. C. source 10 is an auxiliary transformer 17 which is coupled to an auxiliary rectifier and filter system 18 across the output lines 19 and 20 of which there is produced a source $E_B$ of high voltage D. C. for the reference and auxiliary control circuits hereinafter described.

A current-regulator vacuum tube 21, which serves as a variable impedance, is connected in the main high voltage positive line 15, between the D. C. supply or system 14 and the load 22. The function of the tube or series element 21 is to permit or to provide for control of the output voltage $E_o$. The output voltage $E_o$ is always equal to the difference between E and the voltage drop across the series element or regulator tube 21. The voltage drop across tube 21 varies linearly with the grid-to-cathode potential of this tube. This potential is determined by the voltage across the anode resistor 23 of tube 24. Voltage from resistor 23 is taken off at 25 for amplification by an amplifier 26 whose gain is designated as $K_1$, and then by connection 28 the amplified voltage is impressed upon the grid 29 of tube 21. For greater amplification, amplifier 26 may include one or more tubes each similar or equivalent to tube 24, and also if required, a driver tube providing for 180 degrees of phase reversal. Accordingly, the activating signal taken off at 25 for application to grid 29 of the series regulator element or tube 21, is very much amplified.

Connected across the positive output line 30 and the negative line 20 is a constant-current divider to which the D. C. output voltage $E_o$ is applied and which comprises a variable resistor 31 whose resistance at any adjustment thereof is designated as $R_1$, and a fixed resistor 32 whose resistance is designated as $R_2$. By a connection 33 from the constant-current divider 31, 32 to the grid 34 of a tube 35, the latter is made to respond to any occurring variation in output voltage $E_o$.

The anode 36 of tube 35 is connected to the adjustable contact 37 of a potentiometer 38 series connected with resistors 39, 40, and the resistor 41 from anode 42. The respective grids 43 and 44 of tubes 24 and 35 are grounded, as shown. The grid 45 of tube 24 is connected at 46, between two resistors 47 and 48 series connected and comprising a current divider which is connected between anode 42 and line 20. Through resistors 49 and 50, respectively, the cathodes 51 and 52 are also connected to line 20.

A current-regulator vacuum tube 53 connected in line 19 serves as a variable impedance, similarly to tube 21, and functions to maintain $E_R$ constant. An amplifier 54, corresponding to amplifier 26 and whose gain is designated as $K_2$, impresses on the grid 55 of tube 53 signals which are very much amplified and which are taken initially from point 56 between resistors 57 and 58 comprising an input bleeder for the reference itself.

A voltage-regulator tube in the form of a diode 59 is connected between the cathode 60 of tube 53 and the grounded, negative line 16 from the main D. C. source 14.

The respective anodes 61, 62 and 63 of tubes 24 and 59 are returned to line 64. The respective anodes 42 and 63 of tubes 35 and 59 are returned to line 65, through resistor 41 and a resistor 66.

Tube 35 is a very high $\mu$ tube, used as a primary measure or reference for the input comparator system 67.

$E_A$ is a highly stable 300-volt reference which is compared against the output voltage $E_o$ through the constant-current divider 31, 32 in which there is the following, simple relationship.

$$\frac{E_1}{E_2}=\frac{R_1}{R_2}$$

At any setting or adjustment whatsoever of resistor 31 and assuming there are no primary power limitations, the value or magnitude of output voltage $E_o$ is expressed as follows.

$$E_o=E_1=\frac{R_1}{R_2}E_2$$

Assuming that some change or adjustment is made in resistor 31, constant current $i_B$ is then demanded from the reference system. The input bleeder 57, 58 for the reference itself is made to obey the same law as above. Therefore, constant current $i_B'$ is made to flow through the reference system. With the voltage-regulator tube 59 connected as shown, there occurs a potential $E_A$ which is equivalent to that obtained from a voltage-regulator tube operating at a fixed current. Should there occur any slight increase in reference potential $E_R$, current through tube 59 increases correspondingly. This compensating action or effect results in a slight increase in $E_A$, in the proper direction to help compensate for the first effect. The resistor 66 is employed to adjust or regulate the degree and behavior of compensation. As a further refinement, resistor 66 might be a non-linear element, and could be ganged with the range control.

For the purpose of balancing the currents of tubes 24 and 35 and to cause the input line 33 to seek zero with respect to negative line 16, there is provided the adjustment 37 for the plate potential of tube 35 comprising the first stage of comparator 67. The tube 35 should provide as high a gain as possible before any error signal enters the second stage, as such a provision minimizes the changes in input potential resulting from variations in the elements between the first and second stages. Such variations are seen at grid 43 reduced by the gain of tube 35. For example, a variation $\Delta e$ will be seen as $$\frac{\Delta e}{K}$$

where K is the stage gain. To this end, tube 24 comprising the second stage is referenced to ground potential, as shown. Thus, the grid 43 may be reached through a small loss of potential (and gain) through the divider 47, 48. The second stage 24 also is balanced. In this manner, any number of stages can be cascaded with only some loss in band width, but no change in phase. Any potential adjustments required can be performed before entering the driver of amplifier 26 which provides 180 degrees of phase shift, as required by the system.

The combination of components or elements just described provides a system of such high stability and resetability that direct calibration of the output is possible through the substitution of appropriate decades for resistor 31.

Figure 3:
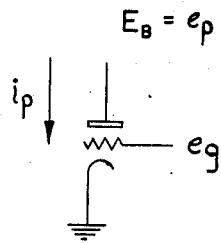
Figs. 3 and 3a are simplified diagrammatic views illustrative of an electronic principle involved in the operating action in Figs. 2 and 4.
Figure 3A:
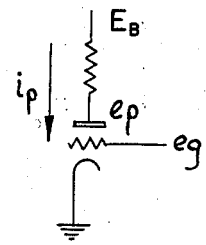

Advantages in my improved system are attributed in large part to the fact that with the input comparator system or circuit 67 operating at zero potential there are provided certain supply potentials each of which has specific characteristics including a high order of stability. As one example of this, there is shown in Figs. 3 and 3a a simple triode tube.

As is well known, variation of plate potential $e_p$ must be accompanied by a change in grid potential $e_g$ to maintain a given plate current $i_p$. From the differential equation $$\mu=\frac{\partial e_p}{\partial e_g}i_p$$

it follows that for a change of $\Delta E_B$ in plate voltage there is required a change in the grid voltage $e_g$ of $$-\frac{\Delta E_B}{\mu}$$

to maintain constant the plate current $i_p$.

The above principle or operating action holds for a tube with a plate load also, according to the equation below.

$$i_p = \frac{E_p + \mu e_g}{R_L + r_p}$$

In the above equation, $R_L$ is the plate load and $r_p$ is the plate resistance. Dependence of the plate current $i_p$ on grid potential $e_g$ is expressed as follows.

$$\frac{di_g}{de_g} = \frac{\mu}{R_L + r_p}$$

For the reasons just given, there is used the very high $\mu$ tube 35 as a primary measure or reference for the input system.

In the operation of my improved system, contact 37 is adjusted so that input grid 34 seeks zero with respect to negative line 16. For a positive displacement of $E_o$ grid 34 will go positive. Anode 42 will go positive and the input to amplifier 26 will go positive by a much larger amount. There is then applied to grid 29 of the series control element or tube 21 a greatly amplified negative signal. Accordingly, the output voltage $E_o$ is reduced. Equilibrium will be reached for the condition whereat there is an approximate equality between $\Delta eK'$ and $$\frac{\Delta E_H}{\mu}$$

wherein $\Delta E_H$ is the change in voltage before tube 21, $\mu$ the effective transfer gain of tube 21, $K'$ the overall gain between grid 34 and tube 21, and $\Delta e$ the error voltage at grid 34. Therefore if $K'$ is sufficiently high, $\Delta e$ will be very small.

Suitable adjustable means indicated at 68 for the auto transformer 11 and the adjustment indicated for resistor 31, are connected by suitable means represented by the dash line 69. Thus, the variable resistor 31 is ganged to the auto transformer 11 so as to provide precisely the correct input voltage for each output voltage demanded by the control system. Good tracking is possible because the output voltage is a linear function of resistance $R_1$.

Figure 5:
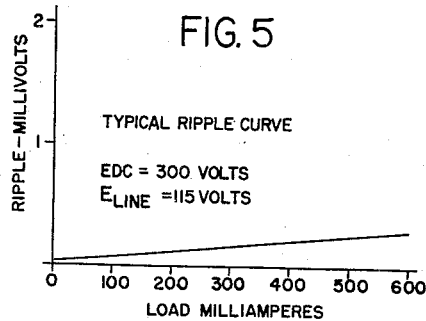
Figs. 5 and 5a are graphical presentations showing the improved performance attributed to the one or more novel features embodied in the circuits disclosed in Figs. 2 and 4.
Figure 5A:
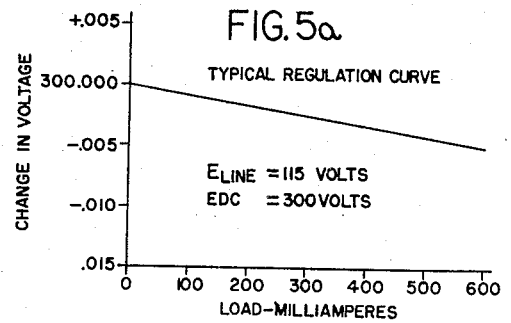

Examples of the outstanding performance of my improved system over those proposed heretofore are shown graphically in Figs. 5 and 5a. Furthermore, an entirely electronic D. C. power source embodying the novel circuit and other features disclosed and claimed herein delivers, with excellent stability and regulation over the entire output D. C. voltage range, power considerably higher than is possible with any of the various electronic power systems of the prior art. Such D. C. power source, embodying my invention, efficiently carries a load drawing as much as six amperes at over three hundred volts.

Important and novel operational methods contributing to all the aforesaid advantage and better performance characteristics, are as follows.

(1) Performance of comparison in such manner that comparison error is not multiplied at low levels.

(2) Arrangement of reference and other errors so that their contributions are constant, percentagewise, rather than in absolute volts.

(3) Stabilization of the comparator system so that the effects of supply and other variations will be minimal.

Considering one of the broader aspects of my invention, this is velieved to reside in the provision of an all-electronic D. C. power source coordinating, as disclosed herein, the balanced comparator system 67 operating at the potential of the negative line 16, the constant-current bleeder 57, 58 using a constant current $i_B'$, the constant voltage reference $E_R$, the voltage-regulator tube 59 employing the constant $i_B'$ to supply the input comparator system 67 in such manner as to stabilize and to compensate its normal errors, and a cascaded amplifier system embodied in and forming part of the input com-parator 67 and imposing no substantial limitations on gain.

Additional gain is available within cascaded stages 24 and 35 because of the disposition of D. C. potentials. Anodes 61 and 42 are at approximately equal potentials and have, furthermore, the same phase relationship with regard to error signals. Accordingly, a suitable impedance element (not shown), such as a fixed resistor connected between anodes 61 and 42 will provide regenerative action resulting in an increase in overall gain. If recurrent stages of the same pattern as in tubes 24 and 35 are employed, a like connection, for the same purpose, can be repeated in a symmetrical manner.

As shown in Figs. 2 and 4, my improved direct current power source embodies an electrical bridgelike configuration wherein the source of current E with the series regulator tube, element or system 21 plus the reference potential $E_R$; forms one arm of a bridgelike configuration and wherein resistances R1 and R2 form the other arm of the latter. The balanced detector or comparator tube or input system 35, connected as shown, senses the null points of the bridgelike configuration. One of these null points might be considered to be at a point on the input comparator line or connection 33 to grid 34, for example, at N2. The other null point might be considered to be a point on the connection to grid 44, for example, at N1. The input comparator system or tube 35 therefore operates with both "sensing" elements 34 and 44 thereof at a potential zero with respect to the potential of the negative line 16. In other words during normal operation the potential of the input comparator line 33 is substantially the same as that of negative line 16. When my improved direct current source is properly adjusted or set, by means of potentiometer 38, the comparator tube or system 35 is perfectly balanced and the potential difference between negative line 16 and each of the null points N1 and N2 is substantially zero. Since $$\frac{E_1}{E_2} = \frac{R_1}{R_2}$$

and since the potential difference between negative line 16 and each of the null points N1 and N2 is zero, it is evident that when the output control 31 is set or adjusted to zero resistance, $E_0$ equals 0, and so on, proportionately.

If the system departs from perfect balance as the result of changes in the detector system 35, it is only necessary to apply metering means across null points N1 and N2 and then, by means of potentiometer 38, to adjust for zero potential between the two null points N1 and N2. When this is done the system error is eliminated and the voltage $E_0$ is then dependent only upon resistances R1 and R2 and the reference potential $E_R$. Thus the system, in addition to possessing extremely high inherent stability, can be made to contribute zero error by simply performing a null balance check periodically.

I claim as my invention:

1. In a direct current power source of the character described, lines respectively positive and negative, control means series-connected in said positive line, means for applying direct current input voltage across the respective input terminals of said lines, the potential at said negative line being fixed equivalent to a ground, a third line, means for applying across said negative line and said third line a reference potential under conditions whereat the potential of said third line is always negative with respect to the potential of said negative line, resistances series-connected with respect to each other and constituting jointly a constant-current divider connected across said third line and the output side of said positive line, a comparator system having an input line connected to said constant-current divider, and means electrically connecting said comparator system and said control means and functional to correlate operating action of said comparator system and said control means in such wise that the potential of said input line during normal operation of said power source is substantially zero with respect to the potential of said negative line.

2. In a direct current power source of the character described, lines respectively positive and negative, control means series connected in said positive line, means for applying direct current input voltage across the respective input terminals of said lines, the potential at said negative line being fixed equivalent to a ground, a third line, means for applying across said negative line and said third line a reference potential under conditions whereat the potential of said third line is always negative with respect to the potential of said negative line, resistances series-connected with respect to each other and constituting jointly a constant-current divider connected across said third line and the output side of said positive line, a comparator system having an input line connected to said constant-current divider, one of said resistances being a variable resistor constituting an output-voltage control for said power source, and means electrically connecting said comparator system and said control means and including potentiometric means, said comparator system being responsive to conditions of adjustment of said potentiometric means thereby to set by such adjustment the potential of said input line at zero with respect to the potential of said negative line.

3. In a direct current power source of the character described, lines respectively positive and negative, control means series-connected in said positive line, means including a variable transformer for applying direct current input voltage across the respective input terminals of said lines, the potential at said negative line being fixed equivalent to a ground, a third line, means for applying across said negative line and said third line a reference potential under conditions whereat the potential of said third line is always negative with respect to the potential of said negative line, resistances series-connected with respect to each other and constituting jointly a constant-current divider connected across said third line and the output side of said positive line, a comparator system having an input line connected to said constant-current divider, one of said resistances being a variable resistor constituting an output-voltage control for said power source, means electrically connecting said comparator system and said control means and functional to correlate operating action of said comparator system and said control means in such wise that the potential of said input line during normal operation of said power source is substantially zero with respect to the potential of said negative line, and means connecting said transformer and said output-voltage control together for simultaneous and coordinative adjustment of the same thus to establish output voltage as a linear function of the resistance of said output-voltage control.

4. In a direct current power source of the character described, lines respectively positive and negative, control means series-connected in said positive line, means for applying direct current input voltage across the respective input terminals of said lines, the potential at said negative line being fixed equivalent to a ground, a third line, means for applying across said negative line and said third line a reference potential under conditions whereat the potential of said third line is always negative with respect to the potential of said negative line, resistances series-connected with respect to each other and constituting jointly a constant-current divider connected across said third line and the output side of said positive line, a balanced-input comparator system having an input terminal on said constant-current divider, and means electrically connecting said comparator system and said control means and including adjustable resistance means, said comparator system being responsive to conditions of adjustment of said resistance means thereby to set by such adjustment the potential of said input terminal at zero with respect to the potential of said negative line.

5. In a direct current power source of the character described, lines respectively positive and negative, control means series-connected in said positive line, means for applying direct current input voltage across the respective input terminals of said lines, the potential at said negative line being fixed equivalent to a ground, a third line, means for applying across said negative line and said third line a reference potential under conditions whereat the potential of said third line is always negative with respect to the potential of said negative line, a first resistance and a second resistance series-connected with respect to each other and constituting jointly a constant-current divider connected across said third line and the output side of said positive line, said power source embodying an electrical bridgelike configuration wherein said input voltage with said control means and with said reference potential constitutes one arm of said bridgelike configuration and wherein said first resistance and said second resistance constitute the other arm of the latter, and a comparator system having sensing elements, one of said sensing elements being connected to said constant-current divider at an intermediate point of the latter, the other of said sensing elements being connected to said negative line, certain of the elements and means forming part of said power source electrically connecting said comparator system and said control means and being so coordinated in said power source and with respect to each other as to establish and maintain during normal operation of said power source null points substantially at said sensing elements and a condition of substantially zero potential between said negative line and each of said null points.

6. In a direct current power source of the character described, lines respectively positive and negative and providing jointly a source of regulated direct current voltage across their respective output terminals, the potential at said negative line being permanently fixed equivalent to a ground, a control element connected in said positive line, the respective output terminals of said lines providing for application to load of direct current output voltage from said source, a constant-current divider disposed electrically at the output end of said source, a reference system, resistors associated with and constituting for said reference system an input bleeder, an input comparator system electrically interposed between said divider and said bleeder and including a substantially balanced detector tube having a first grid connected to said constant-current divider and a second grid connected to said negative line, an amplifier responsive to control signals from said comparator and effective at its output to produce said control signals substantially amplified and negative in sign, connecting means rendering said element responsive to the output signals from said amplifier, and means electrically connected between said detector tube and said amplifier and functional to correlate operating action of said detector tube and said control element in such wise that during normal operation of said power source each of said grids is at a potential substantially zero with respect to the potential of said negative line.

7. In a direct current power source of the character described, lines respectively positive and negative and providing jointly a source of regulated direct current voltage across their respective output terminals, the potential at said negative line being permanently fixed equivalent to a ground, a control element connected in said positive line, the respective output terminals of said lines providing for application to load of direct current output voltage from said source, a constant-current divider disposed electrically at the output end of said source, a reference system, resistors associated with and constituting for said reference system an input bleeder, an input comparator system electrically interposed between said divider and said bleeder and connected to said negative line, an amplifier responsive to control signals from said comparator system and effective at its output to produce said control signals substantially amplified and negative in sign, connecting means rendering said element responsive to the output signals from said amplifier, said comparator system including an electronic tube having an anode and an input grid, and resistance means electrically interposed between said negative line and said anode thereby characterizing said grid in the sense that said grid seeks the fixed negative potential of said negative line.

8. In a direct current power source of the character described, lines respectively positive and negative and providing jointly a source of regulated direct current voltage across their respective output terminals, the potential at said negative line being permanently fixed equivalent to a ground, a control element connected in said positive line, the respective output terminals of said lines providing for application to load of direct current output voltage from said source, a constant-current divider disposed electrically at the output end of said source, a reference system, resistors associated with and constituting for said reference system an input bleeder, an input comparator system including a current divider and electrically interposed between said first-named divider and said bleeder and connected to said negative line, an amplifier responsive to control signals from said second-named divider and effective at its output to produce said control signals substantially amplified and negative in sign, and connecting means rendering said element responsive to the output signals from said amplifier.

9. In a direct current power source of the character described, lines respectively positive and negative and providing jointly a source of regulated direct current voltage across their respective output terminals, the potential at said negative line being permanently fixed equivalent to a ground, a control element connected in said positive line, the respective output terminals of said lines providing for application to load of direct current output voltage from said source, a constant-current divider disposed electrically at the output end of said source, a reference system, resistors associated with and constituting for said reference system an input across which a reference potential is developed, a voltage-regulator tube responsive to variations in said reference potential and associated with said bleeder as a variable impedance to maintain said reference potential substantially constant, an input comparator system electrically interposed between said divider and said bleeder and connected to said negative line, an amplifier responsive to control signals from said comparator system and effective at its output to produce said control signals substantially amplified and negative in sign, and connecting means rendering said element responsive to the output signals from said amplifier.

10. In a direct current power source of the character described, lines respectively positive and negative and providing jointly a source of regulated direct current voltage across their respective output terminals, the potential at said negative line being permanently fixed equivalent to a ground, a control element connected in said positive line, the respective output terminals of said lines providing for application to load of direct current output voltage from said source, a constant-current divider disposed electrically at the output end of said source, a reference system, resistors associated with and constituting for said reference system an input bleeder, an amplifier responsive to signals from said bleeder and effective to amplify the same, a current-regulator tube forming part of said reference system and responsive to the amplified signals from said amplifier, an input comparator system electrically interposed between said divider and said bleeder and connected to said negative line, a second amplifier responsive to control signals from said comparator system and effective at its output to produce said control signals substantially amplified and negative in sign, and connecting means rendering said element responsive to the output signals from said second amplifier.

References Cited in the file of this patent

UNITED STATES PATENTS

| | | |
|---|---|---|
| 2,462,935 | Baker | Mar. 1, 1949 |
| 2,556,129 | Wellons | June 5, 1951 |
| 2,567,880 | Frommer | Sept. 11, 1951 |
| 2,594,572 | Lupo | Apr. 29, 1952 |
| 2,609,527 | Rabwin | Sept. 2, 1952 |
| 2,780,734 | Gamble | Feb. 5, 1957 |